July 28, 1959
M. M. CHECK
2,896,992
KNOB MOUNTING AND SECURING MEANS
Filed April 25, 1955
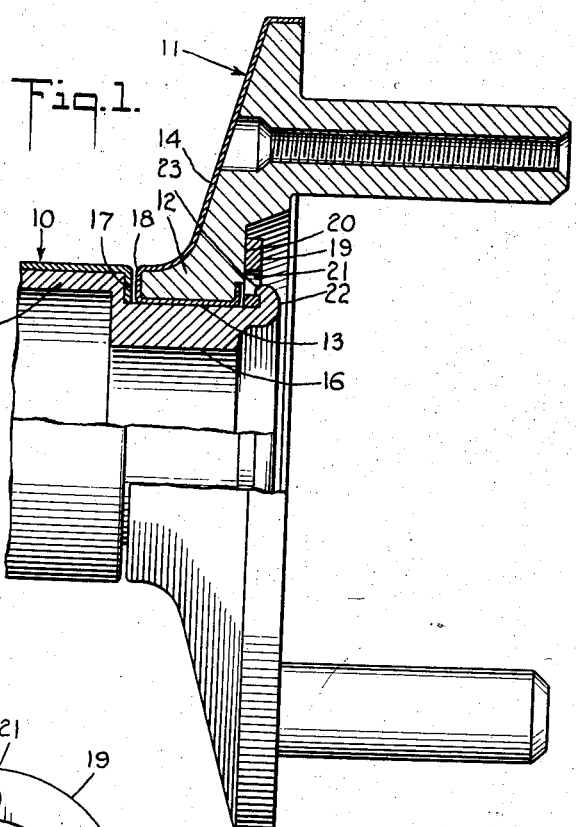
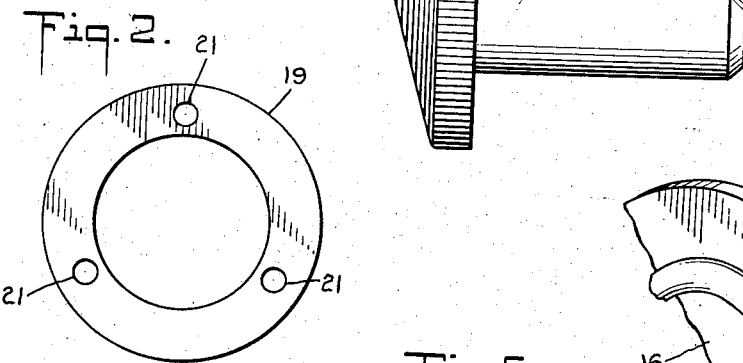
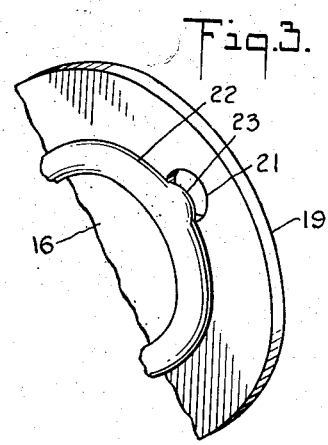
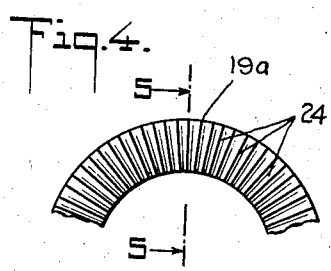
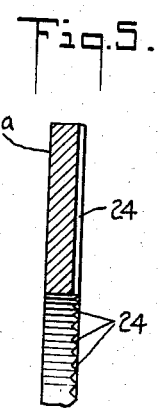
INVENTOR.
M. M. Check
BY
A. H. Golden
ATTORNEY

United States Patent Office 2,896,992
Patented July 28, 1959

2,896,992

KNOB MOUNTING AND SECURING MEANS

Mathias M. Check, Valley Forge, Pa., assignor to The Yale & Towne Manufacturing Company, Stamford, Conn., a corporation of Connecticut Application April 25, 1955, Serial No. 503,637

3 Claims. (Cl. 292—348)

This invention relates to the mounting of a knob on a rose or similar knob support. More particularly, my invention relates to a type of knob mounting in which the shank of the knob rotates within a rose or another body and is maintained against endwise removal by a thrust portion. Even more particularly, my invention relates to a construction of the particular type in which the thrust portion is an integral part of the knob shank and is formed by the spinning of a portion of the knob shank over a surface of the rose or other bearing member.

In constructions of the general class I have indicated, the thrust portion, whether an integral part of the shank, such as a spun-over portion thereof, or a separate thrust member, is separated from the bearing by a washer. As frequently develops, there is more friction between the washer and the bearing member or rose, where a rose is used, than between the knob and the washer. Therefore, the washer will not turn with the knob relatively to the bearing member, but will actually remain stationary so that the knob will have to rotate relatively to the washer. Where the knob shank is spun over, as in the case of a die casting, the spun-over portion is relatively weak, and if it is allowed to rotate relatively to the washer, or relatively to the bearing if a washer is not utilized, it will gradually be worn down and cease to function as a retaining device for the knob.

My invention relates particularly to the keying or locking of the knob to the washer so that the washer will accept the retaining thrust between the knob and the bearing member.

As a particular feature of my invention, the shank of the knob is spun over the washer, the washer being so formed that the spun-over portion will interlock the knob shank and washer for integral rotation. In one form of my invention, openings are formed in the washer, while in another form of my invention, the washer is formed with a serrated surface or the like. Almost any type of multilation of the washer will allow for the movement of the spun-over material into interlocked coaction therewith, and will contribute the feature of a washer and knob rotating together relatively to a knob mounting so that the washer accepts the thrust and wear.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawing:

Fig. 1 shows my novel knob mounting and securing means partly in elevation and partly in longitudinal section.

Fig. 2 is an elevation showing the thrust washer that I utilize in Fig. 1.

Fig. 3 shows in perspective the interlocked relation of the washer and knob shank.

Fig. 4 is an elevation showing a part of a second form of thrust washer.

Fig. 5 is a view taken along line 5—5 of Fig. 4.

For the purpose of describing my invention, I show in Fig. 1 a knob shank 10, and a knob rose 11 that is adapted to support the knob shank 10 for rotation relatively to a lock. The knob rose 11 is rather conventional, and includes a central bearing portion 12 having an opening 13 in which the knob shank 10 rotates. On the rose 11 is a decorative shell 14 that has a part extending inside the bearing opening 13, but this part is in effect an integral part of the bearing portion 12 of the rose, and is not important to a description of my invention. I show the particular knob rose 11 by way of example, and it is to be understood that I can utilize my invention with a mounting member that is not a rose. It is merely necessary that the mounting member have a bearing portion that corresponds to the bearing portion 12 of the rose 11, as will become apparent as the description proceeds.

The knob shank 10 that I show in Fig. 1 has a rather usual construction, including a body 15 that may very well be die cast, this body 15 having an end section 16 that rotates in the opening 13 of the rose. The end section 16 has a diameter somewhat smaller than the outer part of the shank body, thus forming a shoulder 17. This shoulder 17 is opposed to an outer end surface 18 on the bearing portion 12 of the rose 11 and holds the knob shank 10 in inward thrust relation to the rose.

For holding the knob shank 10 in outward thrust relation to the rose 11, I assemble an extremely novel thrust washer 19 on the end section 16 of the knob shank. One side of this thrust washer 19 is opposed to the inner end surface 20 of the rose bearing portion 12, and is adapted to rotate in contact with that surface. On the other side of the thrust washer 19, I form a mutilated surface, preferably by forming openings 21 through the washer, as shown in Figs. 1, 2 and 3. Actually, the openings 21 need not extend through the thrust washer 19, and I form the openings in that way simply to facilitate the manufacture of the washer. It is important merely that the openings 21 be formed at the inner side of the thrust washer 19. Thereby the portions of the washer 19 that surround the openings 21 will act as detents at the inner side of the washer, as I shall now describe.

On the end section 16 of the knob shank 10 is a lip 22 that I form by spinning a part of the shank over the inner surface of the washer 19. In spinning the lip 22 of the knob shank over the thrust washer 19, I force a part 23 of this lip into each opening 21, as shown in Figs. 1 and 3. These parts 23 of lip 22 are then in opposed relation to the parts of the washer around openings 21, thus locking the washer 19 relatively to the knob shank 10. Through this arrangement, the thrust washer 19 will always rotate with the knob shank while holding the shank in outward thrust relation to the rose. The movement that is incidental to knob rotation will then take place between the relatively large thrust washer 19 and bearing surface 20 of the rose, and I am able to eliminate all friction and wear on the thrust portion 22 of the knob shank. Where my invention is not used, the washer will tend to remain stationary, with the knob then rotating relatively thereto until the spun over lip portion 22 is worn and fails to serve its purpose.

While I prefer to form the thrust washer 19 with the openings 21, I do not wish to be limited to such openings because I may very well utilize other particular forms of mutilated surface on the washer. Thus, for example, I show in Figs. 4 and 5 a thrust washer 19a that is formed on its inner side with radially extending serrations 24. When the thrust portion 22 on the knob shank is spun over this side of the thrust washer 19a, parts of the thrust portion will interlock with serrations 24. Thereby the serrations will act as detents, and will cause the washer 19a to rotate with the knob shank 10.

I believe that the construction and operation of my extremely novel knob securing and retaining means will now be well understood. Through my invention, I am able to utilize a washer that accepts the outward thrust of a knob over a relatively large bearing surface, but that is interlocked relatively to the knob so that it rotates always with the knob. Moreover, I accomplish this through extremely simple means that requires virtually no change in the conventional procedure of assembling the knob and the knob rose. Actually, I can assemble the knob through a rather usual spinning operation, yet I do this in such a way that the spun-over portion of the knob shank will be subjected to no wear due to rotation of the knob. I believe, therefore, that the very considerable advantages of my invention will be fully appreciated by those skilled in the art.

I now claim:

1. In a knob mounting of the type in which a shank on the knob rotates in an opening in a mounting member in bearing relation thereto, with a portion on the shank spun over an end surface of the mounting member to retain the knob, the improvement comprising a washer between said spun over portion of the knob shank and said end surface of the mounting member, said washer formed with an opening, and a portion of said shank spun into said opening in said washer to lock said washer to said knob so that said washer rotates with the knob relatively to said mounting member.

2. In a knob mounting of the type in which a shank on the knob rotates in an opening in a mounting member in bearing relation thereto, with a portion on the shank spun over an end surface of the mounting member to retain the knob, the improvement comprising a washer between said spun over portion of the knob shank and said end surface of the mounting member, said washer formed with a detent part, and a part of said spun over portions o fsaid shank coating with said detent part of said washer to lock the washer to said knob shank so that said washer rotates with the knob relatively to said mounting member.

3. In a knob mounting comprising a mounting member having a bearing opening, a knob having a shank in bearing relation to the mounting member in said bearing opening for mounting said knob to rotate, a portion on said knob shank spun over a part of the mounting member around the bearing opening to hold said knob in outward thrust relation to said member, a thrust washer on the knob shank, said thrust washer positioned with one side in bearing relation to the said part of the mounting member and having at its opposed side a detent part, and parts of the spun over portion of the knob shank interlocked with said detent part through the spinning of said portion so that said washer rotates with the knob relatively to said mounting member.

References Cited in the file of this patent

UNITED STATES PATENTS

| 355,650 | Hughes | Jan. 4, 1887 |
| 1,446,587 | Russell | Feb. 27, 1923 |

FOREIGN PATENTS

| 236,055 | Great Britain | July 2, 1925 |

UNITED STATES PATENT OFFICE

CERTIFICATE OF CORRECTION

Patent No. 2,896,992                                                    July 28, 1959

Mathias M. Check

It is hereby certified that error appears in the printed specification of the above numbered patent requiring correction and that the said Letters Patent should read as corrected below.

Column 4, line 14, for "portions o fsaid shank coating" read -- portion of said shank coacting --.

Signed and sealed this 22nd day of December 1959.

(SEAL)
Attest:

KARL H. AXLINE                                                ROBERT C. WATSON
Attesting Officer                                          Commissioner of Patents